(No Model.)
J. E. & E. M. MITCHELL.
PLOW.
No. 448,740. Patented Mar. 24, 1891.
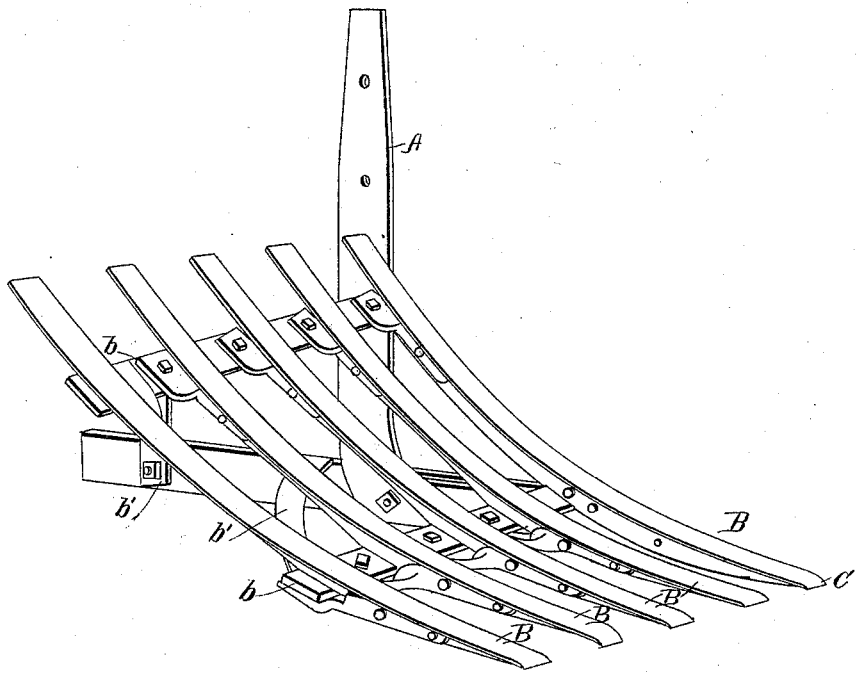
Witnesses
C. C. Burdine.
M. J. Clagett.
Inventor
John E. Mitchell
Elma M. Mitchell
By F. O. McCleary,
Attorney

UNITED STATES PATENT OFFICE.

JOHN E. MITCHELL AND ELMA M. MITCHELL, OF SALEM, IOWA.

PLOW.

SPECIFICATION forming part of Letters Patent No. 448,740, dated March 24, 1891.

Application filed August 30, 1890. Serial No. 363,496. (No model.)

*To all whom it may concern:*

Be it known that we, JOHN E. MITCHELL and ELMA M. MITCHELL, citizens of the United States, residing at Salem, in the county of Henry and State of Iowa, have invented certain new and useful Improvements in Plows; and we do declare the following to be a full, clear, and exact description of the invention, such as will enable others skilled in the art to which it appertains to make and use the same, reference being had to the accompanying drawing, and to the letters of reference marked thereon, which form a part of this specification.

Our invention relates to plows, the object being to provide a plow that will reduce the friction caused by contact with the soil to the minimum, and will be adapted for use in hard clayey soil.

The invention consists in a plow having a mold-board constructed of independent pointed bars or sections secured upon suitable braces.

The invention further consists in the combination, with a plow-standard and suitable braces, of a series of independent bars arranged and combined to form a mold-board, and to present independent disconnected points at their lower ends.

The drawing represents our improved plow in perspective.

A represents the plow-standard, and $b\ b'$ indicate braces. Upon the parallel braces $b$ are firmly bolted a series of sharpened bars, prongs, or sections B, each secured independently, and the whole so relatively arranged as to conform to the general contour of a plow mold-board. One of the bars is projected beyond the others to constitute a plow-point C.

We do not limit ourselves to any particular arrangement of braces, or to any specified number of bars B.

Our construction avoids the use of the usual shear, and we provide a light durable plow adapted especially for hard soils.

It may be found desirable to combine some form of cutter with the bars of the plow to cut off roots, &c., that get between the bars. A horizontal cutter secured above the lower brace would be suitable.

Having fully described our invention, what we claim is—

1. A plow mold-board consisting of a series of parallel bars or sections curved to conform to the shape of a concave mold-board and relatively arranged, substantially as described, to form a plow-point and to present a series of disconnected points at the lower ends of the bars.

2. The combination, with a standard and supporting-braces, of a mold-board consisting of a series of independent curved bars secured upon said braces, the lower ends or points of said bars being arranged to form an inclined cutting-edge consisting of disconnected points, as set forth.

In testimony whereof we affix our signatures in presence of two witnesses.

JOHN E. MITCHELL.
ELMA M. MITCHELL.

Witnesses:
D. W. HENDERSON,
MERTA MITCHELL.